ns(12) United States Patent
Aftanas (10) Patent No.: US 8,016,171 B2
(45) Date of Patent: Sep. 13, 2011

(54) VEHICLE ARTICLE CARRIER HAVING SINGLE SIDED RELEASE CROSS BAR

(75) Inventor: Jeffrey M Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 1009 days.

(21) Appl. No.: 11/559,926

(22) Filed: Nov. 15, 2006

(65) Prior Publication Data

US 2007/0151188 A1 Jul. 5, 2007

Related U.S. Application Data

(60) Provisional application No. 60/750,274, filed on Dec. 14, 2005.

(51) Int. Cl.
*B60R 9/04* (2006.01)
(52) U.S. Cl. ........ 224/315; 224/320; 224/322; 224/325; 224/329
(58) Field of Classification Search .......... 224/309, 224/315, 320, 321, 322, 325, 326, 329; 410/104, 410/105, 145, 146, 147, 148, 149, 150, 152, 410/315
See application file for complete search history.

(56) References Cited

U.S. PATENT DOCUMENTS

| | | | | |
|---|---|---|---|---|
| 2,988,020 A | * | 6/1961 | Stough | 410/152 |
| 2,988,135 A | * | 6/1961 | Caminiti | 296/64 |
| 4,079,677 A | * | 3/1978 | Vandergriff et al. | 410/147 |
| 4,294,388 A | | 10/1981 | Wunstel | |
| 5,688,087 A | * | 11/1997 | Stapleton et al. | 410/150 |
| 5,715,980 A | | 2/1998 | Blankenburg et al. | |
| 5,752,637 A | | 5/1998 | Blankenburg | |
| 5,762,247 A | * | 6/1998 | Cucheran et al. | 224/321 |
| 5,785,475 A | * | 7/1998 | Winstel et al. | 410/146 |
| 5,833,103 A | | 11/1998 | Rak | |
| 5,845,829 A | * | 12/1998 | Stapleton | 224/321 |
| 6,068,169 A | | 5/2000 | Aftanas | |
| 6,112,964 A | | 9/2000 | Cucheran et al. | |
| 6,779,696 B2 | | 8/2004 | Aftanas et al. | |
| 7,044,345 B2 | | 5/2006 | Aftanas | |

* cited by examiner

*Primary Examiner* — Justin M Larson
*Assistant Examiner* — Steven M Landolfi, Jr.
(74) *Attorney, Agent, or Firm* — Harness, Dickey & Pierce, P.L.C.

(57) ABSTRACT

A vehicle article carrier system incorporating at least one single sided release cross bar assembly. The cross bar assembly includes first and second end support assemblies. Detachment or adjustable positioning of the cross bar assembly is made by a user engaging a locking element in a first one of the end support assemblies and moving a cross bar of the cross bar assembly linearly, telescopically slidably into a second one of the end support assemblies. This causes a release of tension provided by a biasing element in the second end support assembly, thus enabling the entire cross bar assembly to be removed from the side rails. The single biasing element in the second cross bar assembly provides a constant tension on latching elements mounted in each of the first and second end support assemblies, which maintain each of the assemblies in locking engagement with the side rails.

14 Claims, 11 Drawing Sheets

VEHICLE ARTICLE CARRIER HAVING SINGLE SIDED RELEASE CROSS BAR

CROSS-REFERENCE TO RELATED APPLICATIONS

This application claims the benefit of U.S. Provisional Application No. 60/750,274, filed on Dec. 14, 2005. The disclosure of the above application is incorporated herein by reference.

FIELD

The present disclosure relates to vehicle article carriers used on motor vehicles, and more particularly, to a vehicle article carrier system employing at least one cross bar having a single sided release feature.

BACKGROUND

The statements in this section merely provide background information related to the present disclosure and may not constitute prior art.

Vehicle article carriers are used in a wide variety of applications to transport a wide variety of articles on an exterior surface of a motor vehicle, such as a car, truck, SUV, etc. Often, such vehicle article carrier systems include a pair of side rails that are fixedly mounted to a roof portion of the vehicle, and a pair of cross bars that are coupled between the side rails. The cross bars are used to support articles thereon above an outer body surface of the vehicle. One or more of the cross bars may be adjustable in position along the side rails so that the spacing between the cross bars can be optimized to best suit a particular article being supported on the cross bars.

Some vehicle article carrier systems employ cross bars that have a single side release mechanism. However, these mechanisms are often complex and/or expensive to construct. A single side release mechanism allows locking components at each end of the cross bar to be simultaneously released from engagement with both of the side rails, when an operator manually engages an actuating or unlocking element at one side of the cross bar. Thus, there is no need for the user to walk around to the opposite side of the vehicle to unlock the other end of the cross bar from its associated side rail.

While single sided release mechanisms used with cross bars in an article carrier system have added significant convenience to the operation and adjustment of the cross bars on a vehicle article carrier system, it would nevertheless be desirable to provide a vehicle article system having a single sided releasable cross bar that requires only a small number of independent component parts for its operation. It would also be desirable to provide a single side release cross bar that is of robust construction.

SUMMARY

The present invention is directed to a vehicle article carrier system that employs at least one side releasable cross bar. The cross bar is supported above an outer body surface of a vehicle by a pair of side rails. The side rails are fixedly secured to the outer body surface so that the opposite ends of the cross bars are supported on the side rails. Each of the side rails further includes a channel formed along its length.

The cross bar includes an end support assembly at each end thereof that is adapted to engage with an associated one of the side rails. A first one of the end support assemblies includes a locking element which the user may engage to detach the first end support assembly from its associated side rail. A second end support assembly disposed at the opposite end of the cross bar is constructed such that an end of the cross bar is movable slidably within the second end support assembly. The second end support assembly also includes a biasing element coupled to a latching element. The latching element engages within a channel of its associated side rail and is maintained under constant tension in engagement with its side rail via the biasing element.

The cross bar may be released by the user first moving the locking element at the first end support assembly into an unlocked position. The user pulls the first end support assembly slightly towards its associated first side rail. This enables the latching element associated with the first end support assembly to be removed from the channel of the first side rail. The user then moves the first end support assembly and the cross bar towards the second side rail, thus releasing the tension on the side rail provided by the biasing element at the second end support assembly. At this point, the user may manipulate the second end support assembly so that the second end support assembly can be removed from the second side rail.

The single sided releasable cross bar, in connection with the first and second side rails, allows the user to release the cross bar from engagement with the side rails while standing along one side of the vehicle and grasping the first end support assembly. There is no need for the user to first detach the first end support assembly from the first side rail and then walk over to the opposite side of the vehicle to disengage the second end support assembly from the second side rail. The design and operation of the cross bar system, in connection with the two side rails, provides a cross bar assembly that can be detached quickly and easily from both of the first and second side rails and without the need for a significant number of independent moving parts within the interior construction of the end support assemblies. Additionally, no cables are required to extend through the interior area of the cross bar, thus simplifying assembly of the cross bar. Advantageously, a single biasing element is used to provide the biasing force that maintains both end supports in latching engagement with their side rails.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
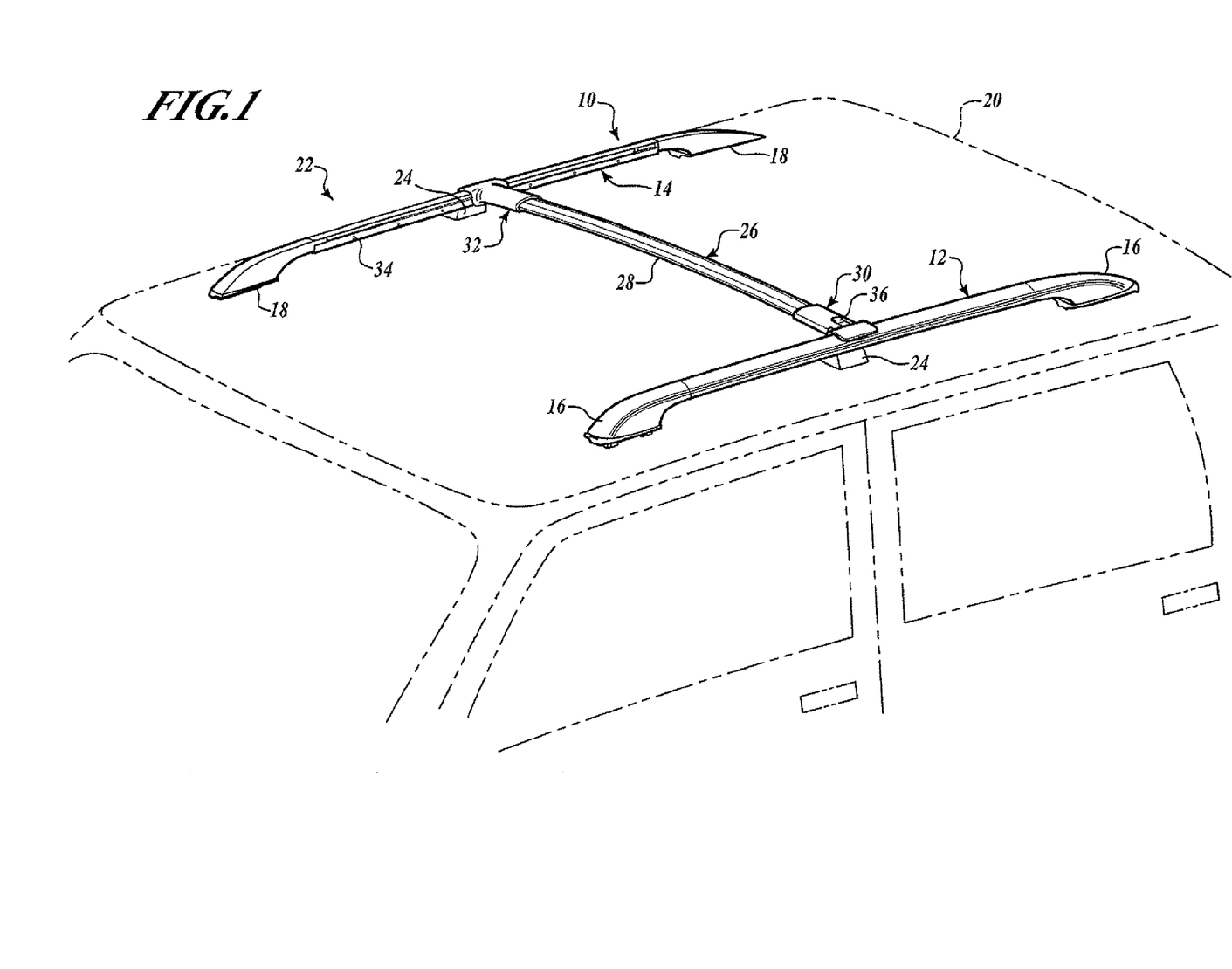
FIG. 1 is a perspective view of a vehicle article carrier system in accordance with a preferred embodiment of the present invention supported on an outer body surface of the motor vehicle.

Referring to FIG. 1, there is shown an article carrier system 10 in accordance with a preferred embodiment of the present invention. The article carrier system 10 includes a first side rail 12 and a second side rail 14, each of which are fixedly supported by a pair of associated support feet 16 and 181 respectively. The support feet 16 and 18 support the side rails 12 and 14 elevationally above an outer body surface 20 of the motor vehicle 22. Intermediate support elements 24 may be optionally included to provide additional support to the side rails 12 and 14.

The system 10 includes a cross bar assembly 26 having a cross bar 28. One end of the cross bar 28 is fixedly coupled to a first end support assembly 30, while the opposite end of the cross bar 28 is telescopically, slidably coupled to a second end support assembly 32. Each of the end support assemblies 30 include latching elements, described in greater detail in the following paragraphs, that engage with facing, spaced apart openings 34 formed in each of the side rails 12 and 14. In FIG. 1, only the openings 34 in the second side rail 14 are visible. The cross bar assembly 26 may be disengaged by a user by actuating a locking element 36 on the first end support assembly 30, removing the first end support assembly 30 from the first side rail 12, and then without having to move to the opposite side of the vehicle, simply manipulating the cross bar assembly 26 to remove the second end support assembly 32 from the second side rail 14. Again, this operation will be described in greater detail in the following paragraphs. The cross bar assembly 26 can thus be adjusted and positioned along the side rails 12 and 14 or completely removed from the side rails 12 and 14 while the user is standing along one side of the vehicle 22. There is no need for the user to walk around to the opposite side of the vehicle 22 before adjustment or removal of the cross bar assembly 26 is to be made.

It will be appreciated that while only a single, adjustable cross bar assemblies 26 is illustrated in FIG. 1, typically a second, fixedly secured cross bar will be included with the article carrier system 10. Optionally, a pair of adjustable cross bar assemblies 26 could be used.

Figure 2:
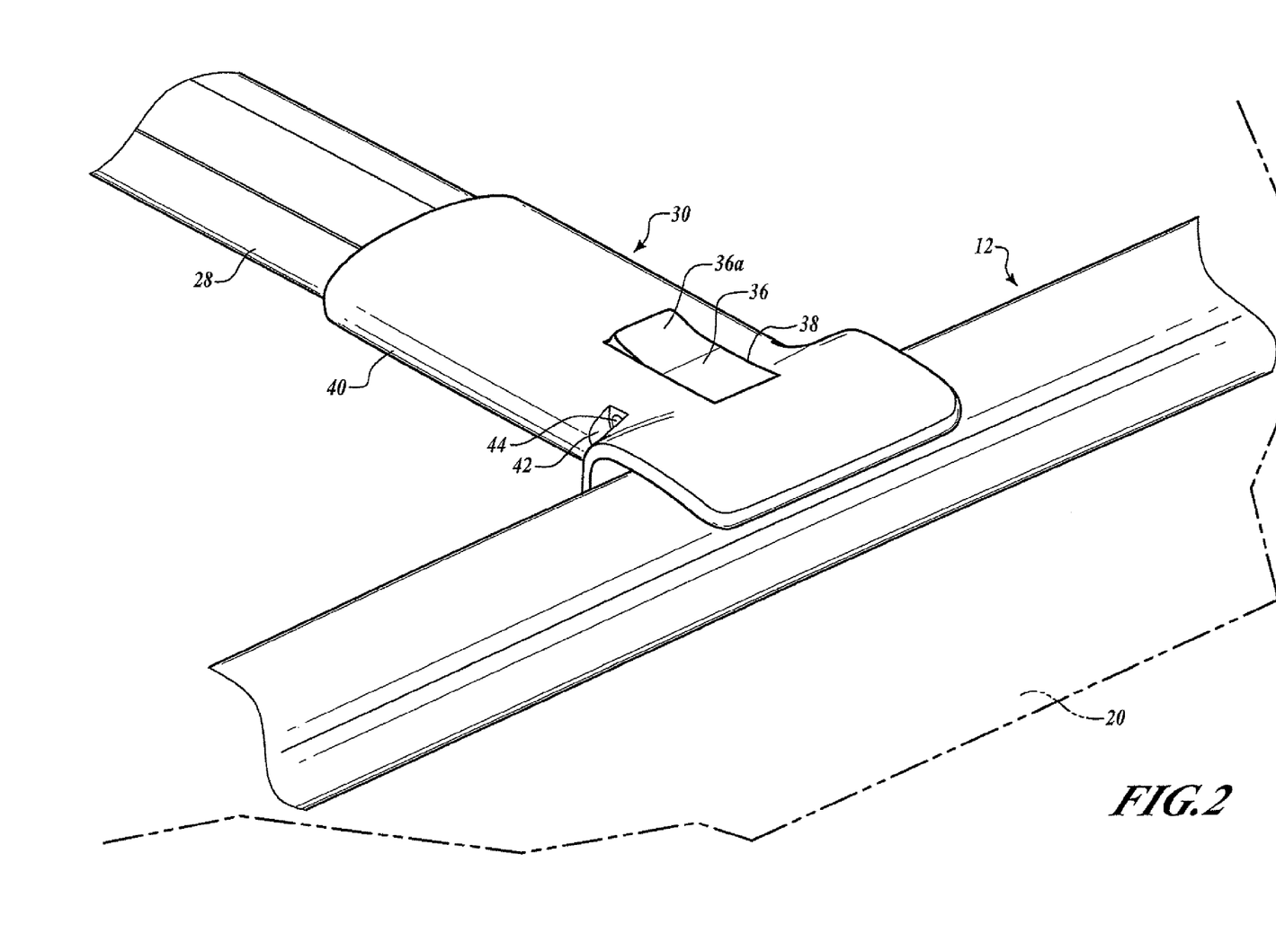
FIG. 2 is an enlarged perspective view of a first one of the end support assemblies of the adjustable cross bar shown in FIG. 1.

Referring briefly to FIG. 2, the first end support assembly 30 can be seen in greater detail. The locking element 36 rests within an opening 38 in a housing 40 of the first end support assembly 30. The locking element 36 includes a raised portion 36a that protrudes above the profile of the end support assembly 30.

Figure 4A:
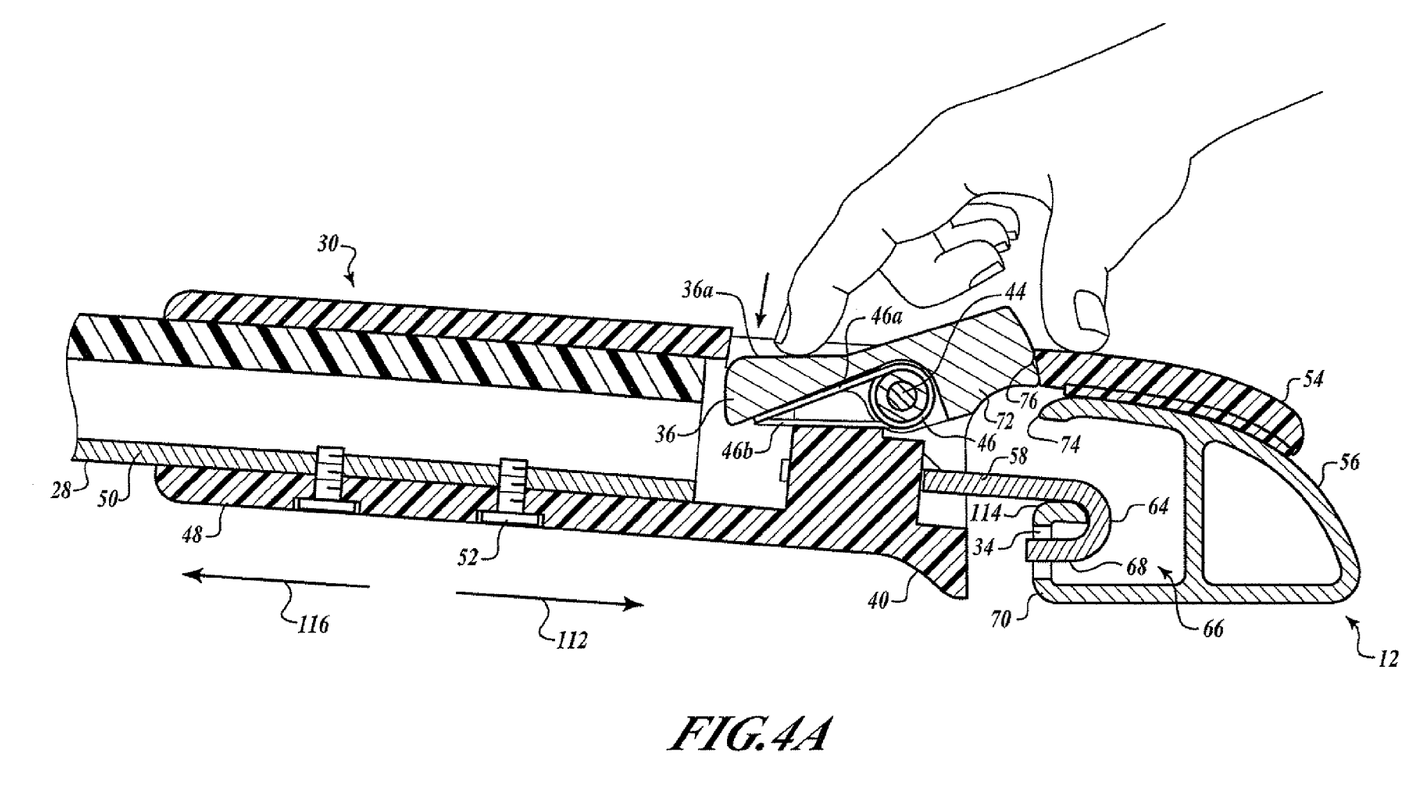
FIG. 4a is a side cross sectional view of the end support assembly of FIG. 2 with the locking element thereof being engaged by a finger of a user to move it into an unlocked position relative to a first one of the side rails supporting it.
Figure 4B:
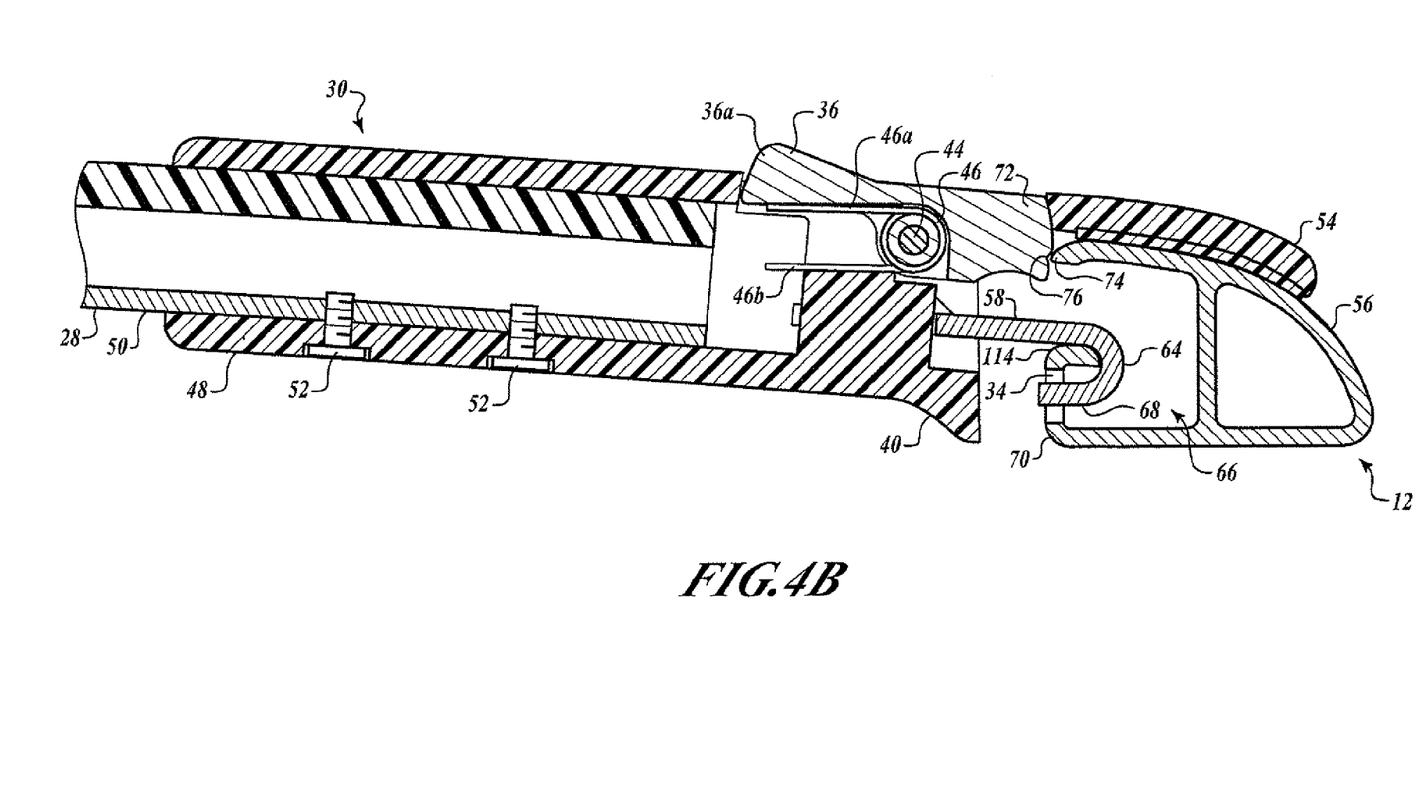
FIG. 4b is a view of the first end support assembly of FIG. 4a with the locking element biased into its locked position by a biasing element.

With additional reference to FIGS. 2, 4a, 4b and 5, the housing 40 includes openings 42 (FIG. 2) in which a pivot pin 44, extending through the locking element 36 (FIGS. 4a, 4b, and 5) rests to enable the locking element 36 to be moved pivotally between an unlocked position (FIG. 4a) and a locked position (FIG. 4b). A biasing element in the form of a coil spring 46 (FIGS. 4a and 4b) provides a biasing force that tends to continuously urge the locking element 36 into its locked position, shown in FIG. 4b. This is accomplished by one end 46a of the biasing element engaging a lower surface 36b of the locking element and the opposite arm 46b of the biasing element 46 engaging internal structure of the housing 40.

With further reference to FIGS. 4a and 4b, the housing 40 includes a tubular neck portion 48 that receives a first end 50 of the cross bar 28 The first end 50 is fixedly secured within the tubular portion 48 by one or more fastening elements 52, which may be threaded fastening elements or any other suitable form of fastener that fixedly secures the end support housing 40 to the first end 50 of the cross bar 28.

Figure 5:
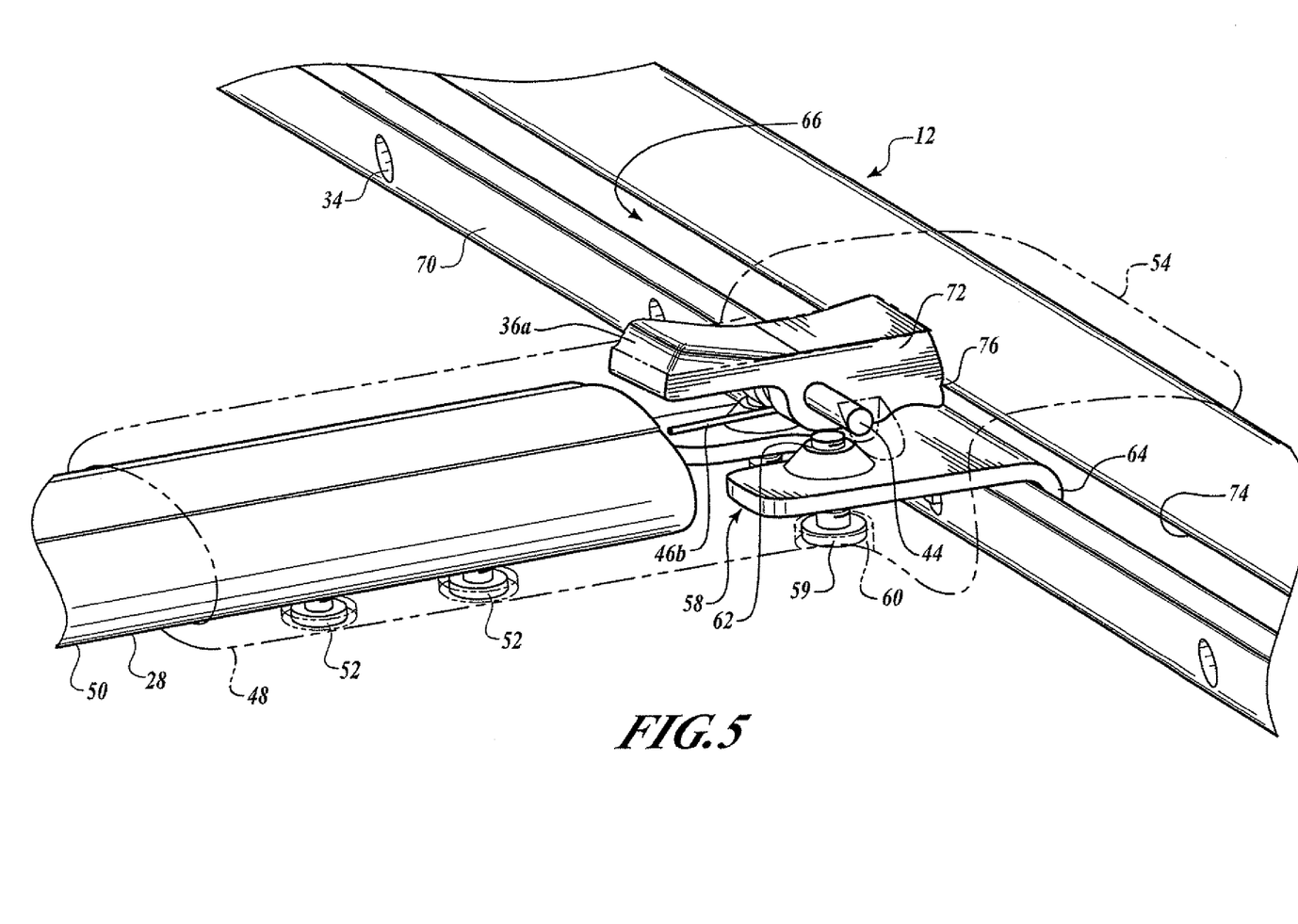
FIG. 5 is an enlarged perspective view of the internal components of the first end support assembly.

With continuing reference to FIGS. 4a, 4b, and 5, the housing 40 includes a lip portion 54 that rests on an outer wall 56 of the first side rail 12. A latching element 58 is also fixedly secured to the housing 40 (FIG. 5) by at least one threaded fastening element 59 (FIG. 5) that extends through an associated opening 60 in the housing 40 and into engagement with an opening 62 in the latching element 58. Preferably a pair of fastening elements 59 are used to secure the latching element 58 to the housing 40. The latching element 58 includes a hook portion 64 (FIGS. 4a and 4b) that extends within a channel 66 in the first side rail 12. An end 68 of the hook portion 64 engages within one of the openings 34 in an inside wall portion 70 of the side rail 12.

With continuing reference to FIGS. 4a and 4b, when the user presses on the raised portion 36a of the locking element 36, as illustrated in FIG. 4a, a forward edge portion 72 of the locking element 36 is pivoted upwardly out of abutting engagement with an upper edge portion 74 of the side rail 12. When the user removes his/her finger from the locking element 36, the biasing element 46 immediately rotates the locking element 36 pivotally (clockwise in FIGS. 4a and 4b) so that the forward edge portion 72 abuttingly engages edge portion 74. The forward edge portion 72 may include a notch or depression 76 that provides a detent for even more positively engaging with the edge portion 74. In the locked position of FIG. 4b, the first end support assembly 30 cannot be lifted off of the first side rail 12 nor moved laterally because of the abutting contact of forward edge portion 72 and edge portion 74. Thus, to begin the process of removing or adjustably positioning the cross bar assembly 26, the user must first move the locking element 36 into its unlocked position as shown in FIG. 4a.

Figure 3:
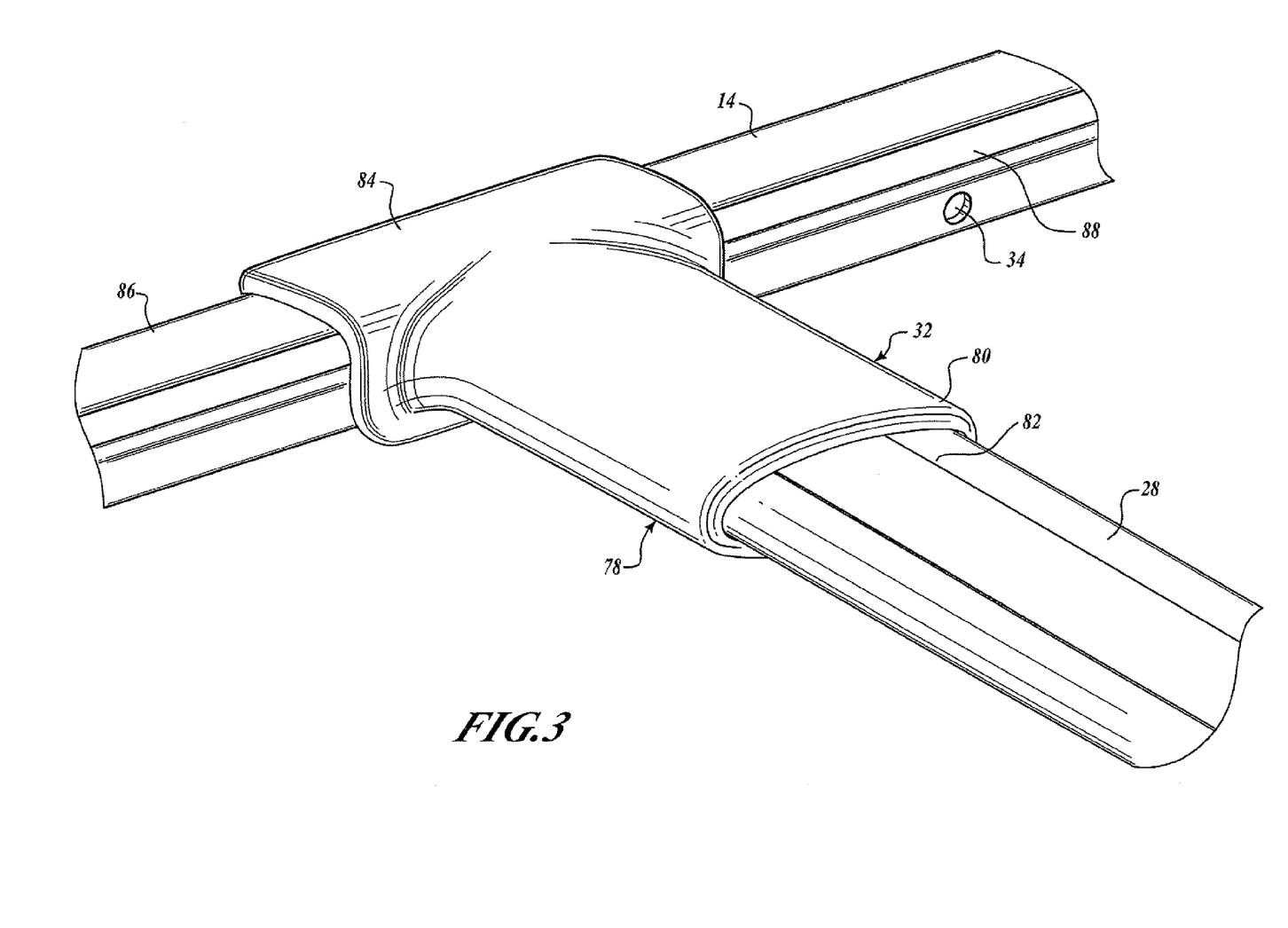
FIG. 3 is an enlarged perspective view of a second one of the end support assemblies of the adjustable cross bar of FIG. 1.
Figure 6:
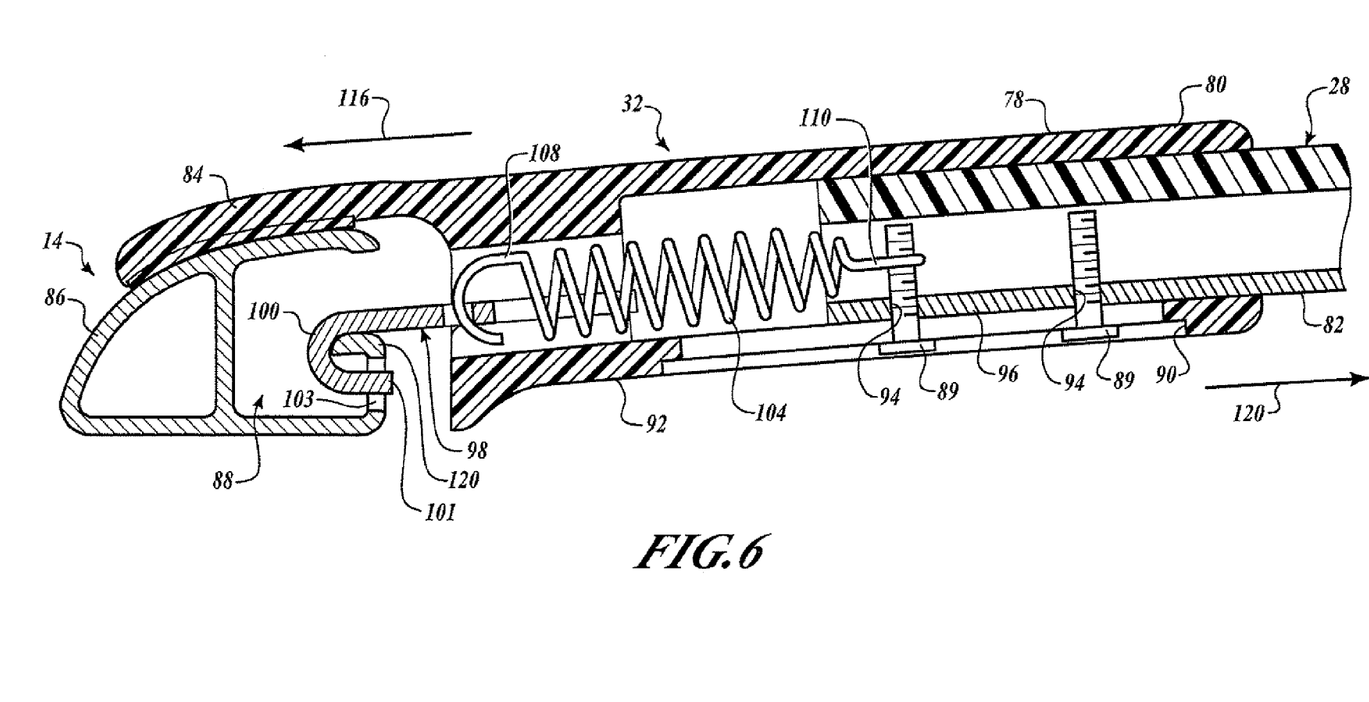
FIG. 6 is a side cross sectional view of the second end support assembly coupled to a second one of the side rails.

Referring to FIGS. 3 and 6-9, the construction of the second end support assembly 32 can be seen in greater detail. With reference specifically to FIGS. 3 and 6, the second end support assembly 32 includes a housing 78 having a tubular end portion 80 which receives a second end 82 of the cross bar 28. The cross bar 28 is telescopically, slidably coupled to the housing 78, as will be described momentarily. The housing 78 also includes a lip portion 84 that rests over an upper, outer wall portion 86 of the second side rail 14. The second side rail 14 is constructed identically to the first side rail 12, and thus includes an elongated channel 88 having the spaced apart openings 34 formed therein.

Figure 7:
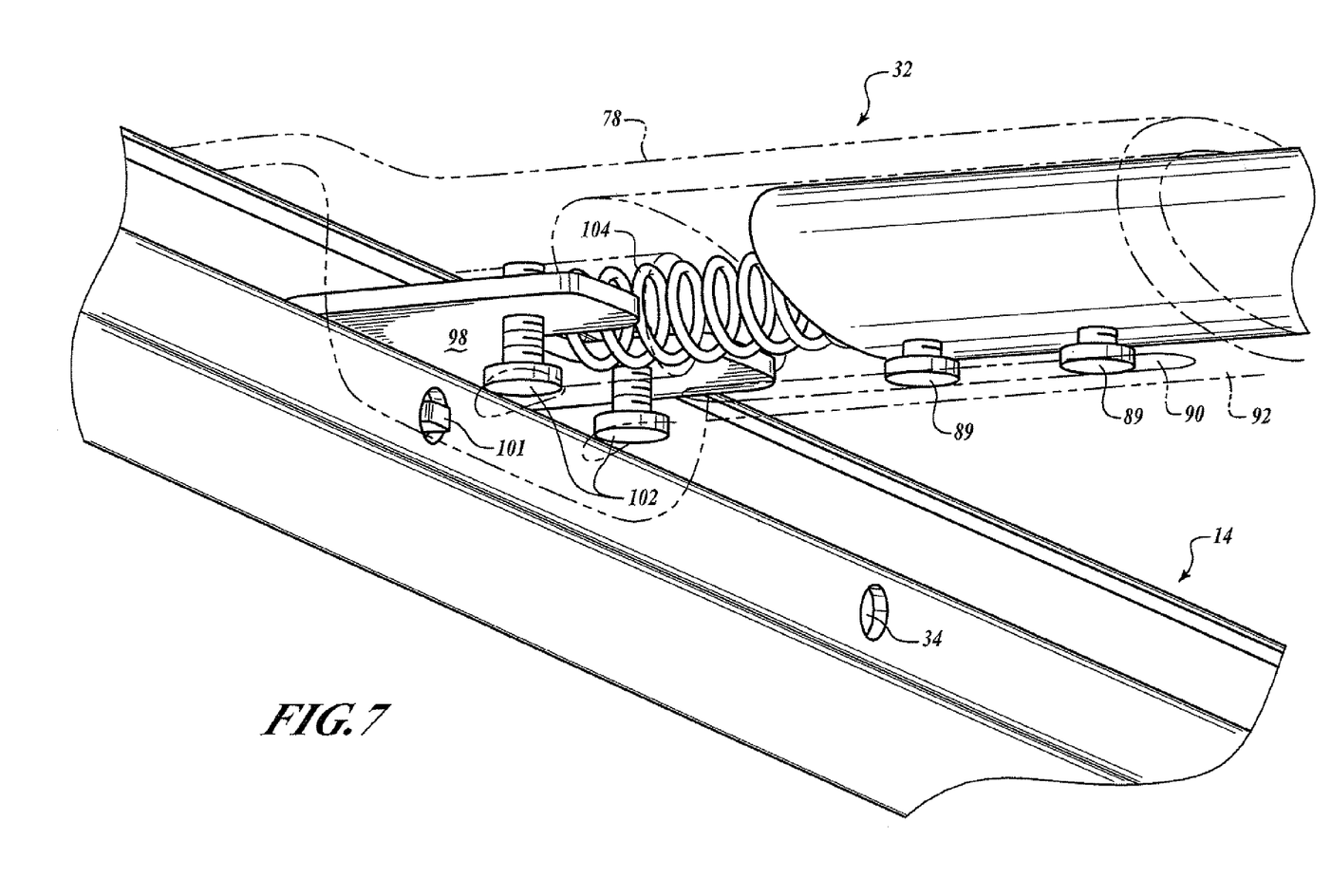
FIG. 7 is an enlarged perspective view of the internal components of the second end support assembly illustrating the second end support assembly coupled to the second side rail.
Figure 8:
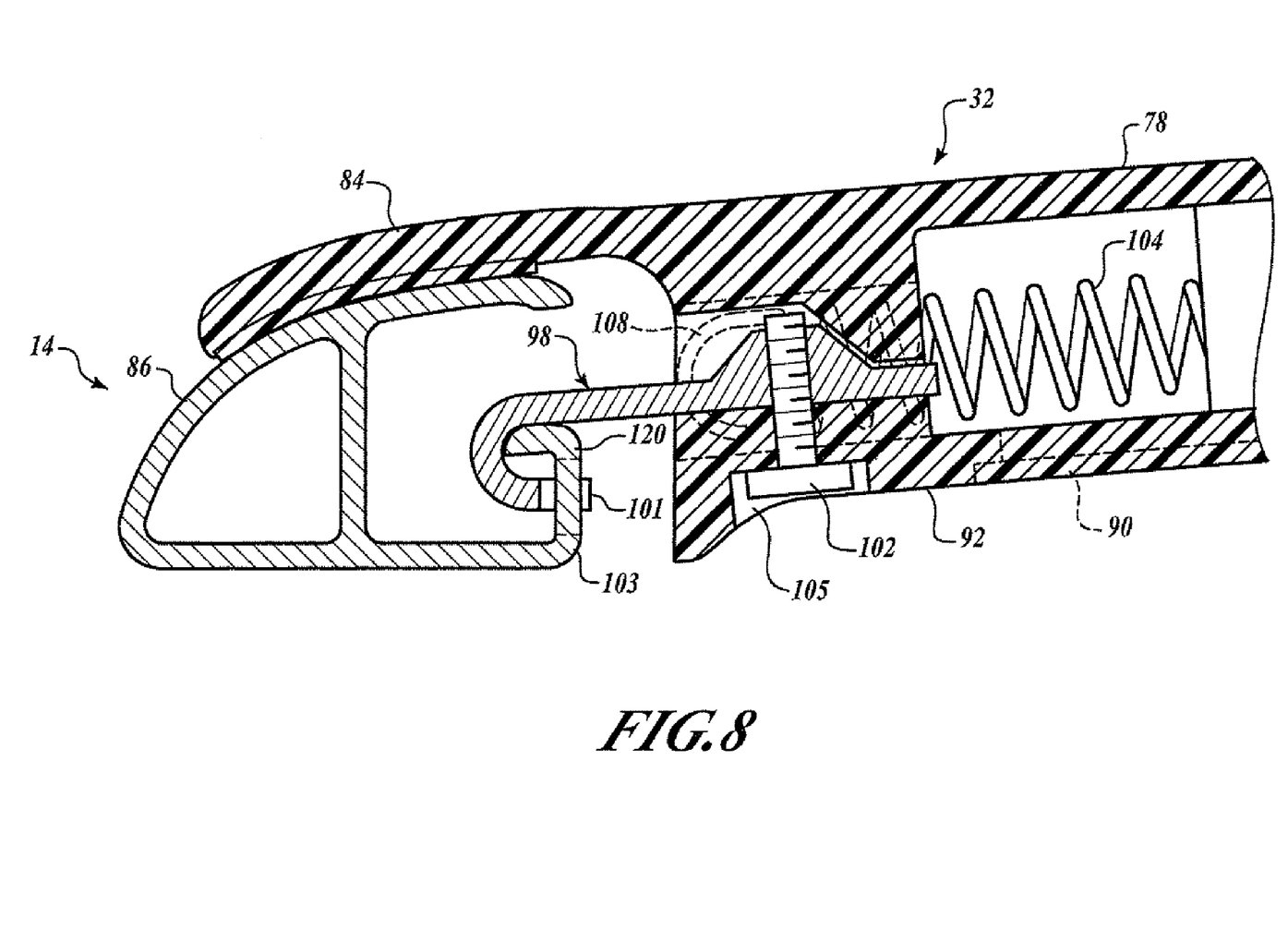
FIG. 8 is a cross-sectional side view of the second end support assembly coupled to the second side rail.

With specific reference to FIGS. 6-8, the internal construction of the second end support assembly 32 can be seen in greater detail. Referring initially to FIG. 6, the second end 82 of the cross bar 28 is coupled to the housing 78 for sliding movement by a pair of fastening elements 89. The fastening elements 89 extend through an elongated slot 90 formed in a lower wall 92 of the housing 78 and into openings 94 in a lower surface 96 of the cross bar 28. The fastening elements 89 are thus free to move slidably within the elongated slot 90. This enables the second end 82 of the cross bar 28 to be moved slidably linearly within the tubular end portion 80, but still captures the end 82 of the cross bar 28 within the housing 78.

With specific reference to FIGS. 6 and 7, the second end support assembly 32 also includes its own latching element 98 having a hook portion 100. The hook portion 100 has a tip 101 that is sized to engage within one of the spaced apart openings 34 in an inner wall 103 of the second side rail 14. In FIG. 7, the latching element 98 is fixedly coupled to the housing 78 by a pair of fastening elements 102 that extend through openings 105 in the lower wall 92. The latching elements 98 and 58 each also form a U-shape, when viewed from either the top or the bottom. A biasing element 104 is coupled thereto to latching element 98.

Figure 9A:
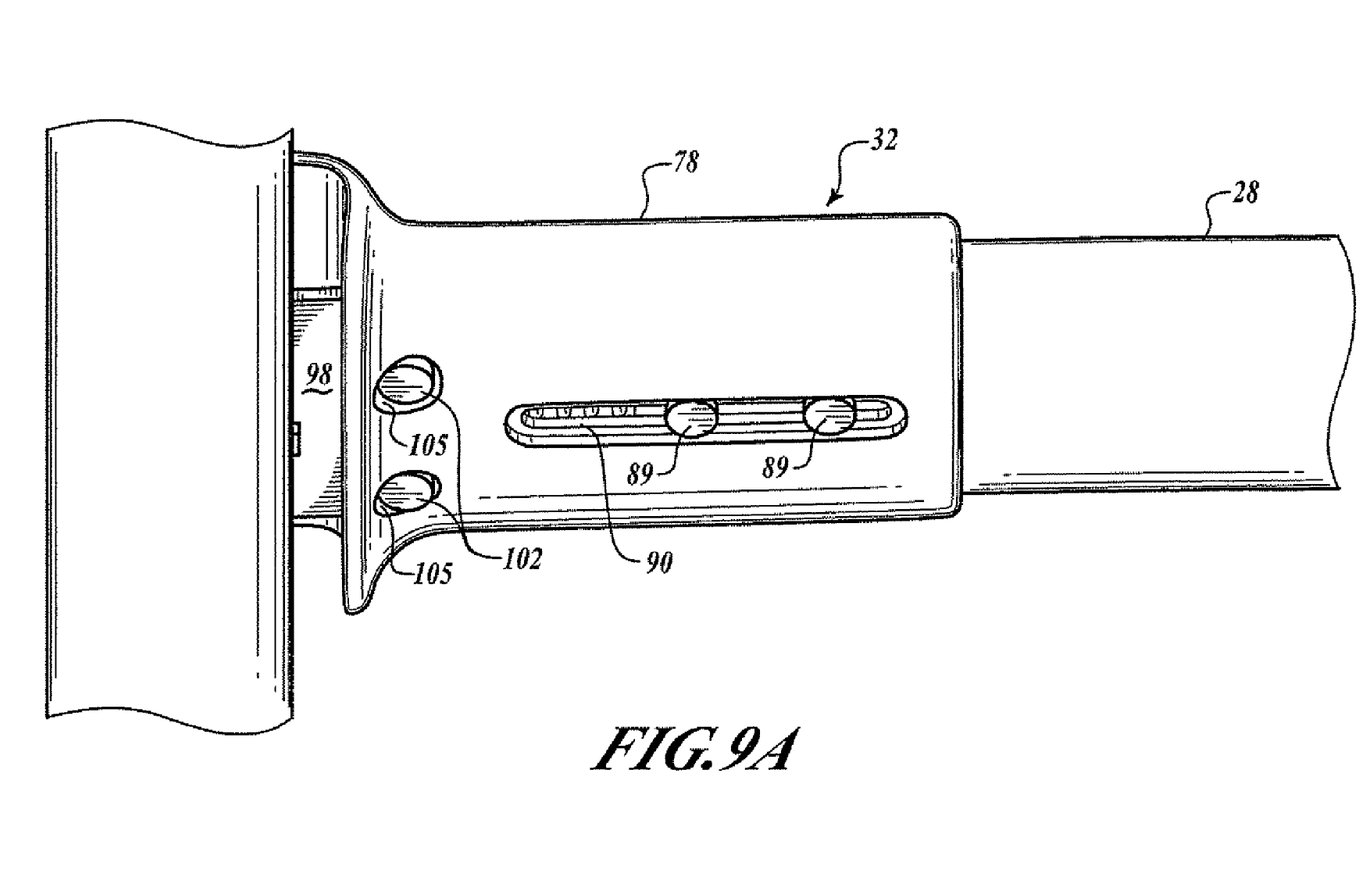
FIG. 9a is a bottom perspective view of the second end support assembly latched to the second side rail.
Figure 9B:
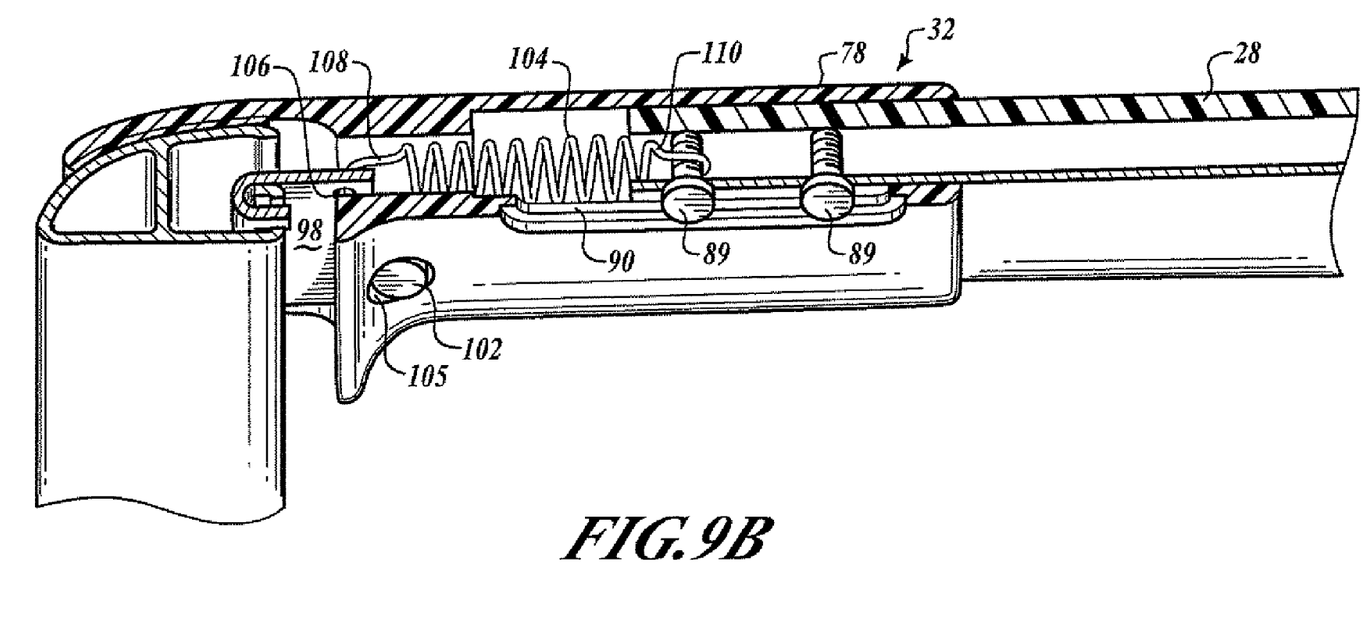
FIG. 9b is a partial cross sectional side perspective view of the second end support assembly of FIG. 9a illustrating the internal components of the second end support assembly.

With brief reference to FIG. 9b, the latching element 98 also includes an opening 106 in which a first end 108 of the biasing element 104 extends. An opposite end 110 of the biasing element 104 engages one of the fastening elements 89. The biasing element 104, in this embodiment, comprises a coil spring that operates to provide a tension force between the second end 82 of the cross bar 28 and the latching element 98. Thus, the biasing element 104 operates to provide a constant tension force that urges the latching elements 98 and 58 into engagement with the openings 34 in their respective side rails 14 and 12.

In operation, when the user wants to remove the cross bar assembly 26 from the side rails 12 and 14, the user begins by pressing down on the locking element 36 at portion 36a, as shown in FIG. 4a. This causes rotation of the locking element 36 from the position in FIG. 4b into the position shown in FIG. 4a. Edge portion 72 is thus moved upwardly above the edge portion 74 of the first side rail 12. The user may then release pressure on the locking element 36 and then pull the entire end support assembly 30 longitudinally in the direction of arrow 112 in FIG. 4a until hook portion 64 clears ledge portion 114 of the first side rail 12, and then lift upwardly slightly such that the end portion 68 is positioned above the ledge portion 114. The user then allows the cross bar 28 to be urged to the left in FIG. 4a, in accordance with arrow 116, by the biasing force of the biasing element 104.

With reference to FIG. 6, movement of the cross bar 28 in accordance with arrow 116 further releases the tension being provided by the biasing element 104. The user continues to move the cross bar 28 linearly in accordance with arrow 116 until the hook portion 100 moves to the left in FIG. 6 out of engagement with its associated opening 34. At this point, the user lifts the cross bar assembly 26 so that the hook portion 100 of latching element 98 is lifted upwardly to clear ledge 120 of the second side rail 14. When hook portion 100 is positioned above the ledge 120, the user can then again move the entire cross bar assembly 26 to the right in FIG. 6, in accordance with directional arrow 120, to withdraw the hook portion 100 from the channel 88, and thus allow the end support assembly 32 to be removed from the second side rail 14. Removal of the entire cross bar assembly 26 can thus be accomplished from one side of the vehicle 22 adjacent the first end support assembly 30. The same operation is performed if the user wishes to reposition the cross bar assembly 26 at a different longitudinal position along the side rails 12 and 14.

Reattachment of the cross bar assembly 26 to the side rails 26 essentially comprises the above-described operational steps, but in the reverse order. The user grasps the cross bar assembly 26 while standing adjacent the first side rail 12. The user then positions the second end support 32 at a desired longitudinal position along the second side rail 14, and the second end support assembly 32 is maneuvered so that the hook portion 100 of the latching element 98 is inserted into the channel 88 of the second side rail 14. The user may need to move the end support assembly 32 slightly longitudinally as he/she pulls slightly on the cross bar 28, until the hook portion 100 engages within one of the spaced apart openings 34 in the second side rail 14. While holding the locking element 36 depressed, the user then positions the first end support assembly 30 over the correspondingly longitudinally aligned opening 34 in the first side rail 12. The user then pulls on the cross bar 28 against the biasing force of biasing element 104 as the biasing element 56 is maneuvered into the channel 66 of the first side rail 12. While holding the first end support assembly 30 under tension, the hook portion 64 is maneuvered such that it is positioned over the corresponding longitudinal opening 34 in the first side rail 12. The user then lowers the first end support assembly 30 until the latching element 58 rests on the ledge portion 114 (FIG. 4a) and then releases the tension on the first end support assembly 30. The biasing element 104 immediately draws the hook portion 68 of the latching element 58 into engagement with the corresponding opening 34 in the side rail 12. At this point, both of the latching elements 58 and 98 are under tension and securely engaged with their respective side rails 12 and 14. As the user releases the locking element 36, notch 76 engages with edge portion 74 of side rail 12, thus preventing any further longitudinal movement of the cross bar assembly 26.

The article carrier system 10 thus provides a cross bar assembly that can be quickly and easily removed from the side rails 12 and 14 or adjustably positioned along the side rails 12 and 14, from one side of the vehicle 22. Advantageously, the cross bar assembly 26 includes only a minimal number of independent moving parts. The cross bar 28 is preferably made from aluminum or another suitable high strength, weather resistant material, and is preferably roll formed or extruded. Support housings 40 and 78 are preferably made from high strength plastics or other suitably strong materials. The side rails 12 and 14 are preferably made from aluminum or other suitably strong materials. The end supports 16 and 18 are preferably made from high strength plastic or other suitably strong, weather resistant materials, as are the supports 24.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:
1. A vehicle article carrier apparatus comprising:
 first and second support rails secured to said vehicle so as to be arranged generally parallel to one another;
 a cross bar assembly including a cross bar, a first end support assembly disposed at a first end of said cross bar and fixedly secured to said cross bar so as not to be moveable relative to said cross bar, and a second end support assembly disposed at a second end of said cross bar and being moveable slidably relative to said cross bar;

said first end support assembly including a first latching element fixedly secured so as to be non-moveable relative to a housing of said first end support;

said second end support assembly including a second latching element fixedly secured so as to be non-moveable relative to a housing of said second end support assembly, and wherein said second end support assembly is slidably moveable relative to said cross bar;

a biasing member operably coupled at a second end to said second latching element of said second end support assembly, and being operatively coupled at a first end thereof to said cross bar, to thus bias the cross bar towards the second end support assembly, and thus bias said latching elements toward one another;

said slidably secured second end support assembly enabling said latching elements to be detached from, and attached to, said support rails by linearly moving said cross bar relative to said second end support assembly, to thus enable said latching elements of said cross bar assembly to be attached to and detached from said support rails;

said first end support assembly including a pivotally mounted locking element having a first portion and a second portion, the second portion engaging with a portion of its respective said support rail, to prevent lateral movement and removal of said first end support assembly from its respective said support rail; and said pivotally mounted locking element enables a user to press on the first portion and rotate the second portion of the pivotally mounted locking element upwardly out of abutting engagement with an upper edge portion of its respective said support rail, to permit lateral movement of said cross bar assembly relative to said respective support rail, and thus removal of said first end support assembly from its respective said support rail.

2. The apparatus of claim 1, further comprising a torsion spring operably associated with the pivotally mounted locking element, to maintain the pivotally mounted locking element in a locked orientation relative to its respective said support rail when no pressure is being applied to said first portion of said pivotally mounted locking element.

3. A vehicle article carrier for supporting articles above an outer body surface of a motor vehicle, the vehicle article carrier comprising:

first and second support rails fixedly secured to said outer body surface and extending generally parallel to one another, each of said first and second support rails including a plurality of spaced apart openings that are laterally aligned with one another when said support rails are secured to said outer body surface, to thus form aligned pairs of openings;

a cross bar assembly adapted to be secured to said support rails for supporting articles thereon above said outer body surface;

said cross bar assembly including a cross bar and first and second end support assemblies at opposite ends of said cross bar, said first end support assembly operating to engage said first support rail and said second end support assembly operating to engage said second support rail;

said first end support assembly including a first housing and a first J-shaped latching element disposed therein, for securing said first end support assembly to one of said openings in said first support rail;

said second end support assembly including a second housing with a second J-shaped latching element disposed therein, said second end support assembly being telescopically and slidably coupled to a respective end of said cross bar, and said second J-shaped latching element being secureable to one of said openings in said second support rail; and a biasing element for maintaining tension between said second J-shaped latching element and said cross bar, to thus provide tension and maintain said end support assemblies secured to their respective said support rails, said cross bar assembly being detachable from said support rails by back and forth linear movement of said cross bar so as to sequentially disengage said latching elements from said openings in their respective said support rails; and said first end support assembly including a pivotally mounted locking element positioned within the housing of said first end support assembly, and moveable between locked and unlocked positions, for permitting said first end support assembly to be locked to said first support rail, said locking element having a first portion and a second portion, the first portion being able to be depressed by a user to rotate said locking element into said unlocked position wherein said second portion moves upwardly out of abutting engagement with an upper edge portion of said first support rail, to then permit lateral movement of said first end support assembly and removal of said first end support assembly from said first support rail, and when said locking element is positioned in said locked position the second portion is positioned adjacent a portion of said first support rail so as to prevent lateral movement of said first end support assembly relative to said first support rail, and thus maintain said first end support assembly locked to said first support rail.

4. The vehicle article carrier of claim 3, wherein said biasing element has a second end coupled to said latching element of said second end support assembly, and a first end operably coupled to said cross bar.

5. The vehicle article carrier of claim 3, wherein each of said end support assemblies includes a lip portion for resting over a portion of a respective one of said support rails.

6. The vehicle article carrier of claim 3, further including a biasing member for biasing said locking element into a first position, wherein the second portion of said locking element abuts a portion of said first support rail, to prevent lateral movement and thus removal of both of said end support assemblies from both of said support rails.

7. The vehicle article carrier of claim 6, wherein said biasing member operates to return said locking element from a second position, in which said first end support assembly may be removed from said first support rail, to said first position.

8. A vehicle article carrier for supporting articles above an outer body surface of a motor vehicle, the vehicle article carrier comprising:

first and second support rails fixedly secured to said outer body surface and extending generally parallel to one another;

a cross bar assembly adapted to be secured to said support rails for supporting articles thereon above said outer body surface;

said cross bar assembly including a cross bar and first and second end support assemblies secured at opposite ends of said cross bar, said first end support assembly operating to engage said first support rail and said second end support assembly operating to engage said second support rail;

said first said end support assembly including a first housing with a first lip for resting on said first support rail, a user engageable, pivotally mounted locking element supported on said first housing;

the pivotally mounted locking element having a first portion adapted to be pressed with a finger of a user to move the pivotally mounted locking element such that a second portion of the locking element is moved from a first locked position to a second unlocked position for enabling said first end support assembly to be unlocked from said first support rail, and a first latching element fixedly secured to said first housing for engaging said first support rail;

said second end support assembly including:
a second housing having a second lip for resting on said second support rail, said second housing being telescopically coupled to a respective end of said cross bar for enabling sliding movement of said second housing relative to said cross bar;
a second latching element for latching said second end support assembly to said second support rail, and including a biasing element for securing said second latching element under tension to said cross bar assembly such that said cross bar assembly is not removable from said support rails unless said pivotally mounted locking element is moved from said first locked position to said second unlocked position, such that said second portion of said locking member is moved upwardly to be positioned clear of an upper surface of said first support rail to permit lateral movement of said first end support assembly toward said first support rail, and disengagement of said first latching element from said first support rail when said cross bar assembly is subsequently moved linearly toward said second support rail to release tension on said biasing element so that said second latching element can be removed from said second support rail;
and wherein said first and second latching elements are fixedly secured to their respective housings so as to be non-moveable relative to their respective housings.

9. The apparatus of claim 8, further comprising a biasing member for biasing said pivotally mounted locking element into said first locked position when no pressure is being applied by the finger of said user to said portion of said pivotally mounted locking member.

10. The apparatus of claim 8, wherein said first latching element comprises a hook shaped latching element, and said first support rail includes a channel having a plurality of spaced apart openings, with said hook shaped latching element adapted to engage with a selected one of said openings.

11. The apparatus of claim 8, wherein said second latching element comprises a hook shaped latching element adapted to engage with one of a plurality of spaced apart openings formed in said second support rail.

12. The apparatus of claim 8, wherein said pivotally mounted locking element includes a forward edge portion at said second portion which is adapted to engage with a portion of said first support rail when said first latching element is in said first position, thus preventing lateral movement of said first end support assembly, and thus removal of said first end support assembly from said first support rail.

13. A cross bar assembly for a vehicle article carrier system, wherein the vehicle article carrier system includes a pair of support rails arranged generally parallel to one another and secured to a body surface of the vehicle, said cross bar assembly including:
a cross bar;
a first end support assembly disposed at a first end of said cross bar and a second end support assembly disposed at a second end of said cross bar:
said second one of said end support assemblies being slidably secured to its respective said end of said cross bar;
said first end support assembly including a first housing having a first latching element fixedly disposed therein so as to be non-moveable, and said second end support assembly including a second housing having a second latching element fixedly disposed therein so as to be non-moveable;
a biasing member coupled to said second latching element of said second end support assembly for biasing said latching elements toward another;
said second end support assembly enabling said latching members to be detached from, and attached to, said support rails by linearly moving said cross bar assembly, to thus enable said cross bar assembly to be attached to and detached from said support rails; and
said first end support assembly including a pivotally mounted locking element disposed in an opening in said first housing, said pivotally mounted locking element having a first portion adapted to be pressed by a finger of a user to move a second portion of the pivotally mounted locking element out of a locked position upwardly, relative to a first one of said pair of support rails, and into an unlocked position in which the second portion of the pivotally mounted locking element is positioned clear of an upper surface of said first one of said pair of support rails, such that when said second portion of said locking element is moved out of said locked position said first end support may be moved laterally toward said first one of said support rails to facilitate removal of said cross bar assembly.

14. The apparatus of claim 13, further comprising a torsion spring operably associated with the pivotally mounted locking element, to maintain the second portion of the pivotally mounted locking element in a locked orientation relative to said first one of said pair of support rails when no pressure is being applied to said first portion of said pivotally mounted locking element.

* * * * *